UNITED STATES PATENT OFFICE.

BENJAMIN TALBOT, OF CHATTANOOGA, TENNESSEE.

PROCESS OF PURIFYING METALS.

SPECIFICATION forming part of Letters Patent No. 476,091, dated May 31, 1892.

Application filed January 19, 1892. Serial No. 418,583. (No specimens.)

*To all whom it may concern:*

Be it known that I, BENJAMIN TALBOT, a resident of Chattanooga, Hamilton county, Tennessee, formerly a subject of Great Britain, but having declared my intention of becoming a citizen of the United States, have invented certain new and useful Improvements in the Process of Purifying Metals, of which the following is a specification.

My invention relates to the art of purifying iron in particular, although it is, I believe, applicable to the treatment of other metals, and has in view as its principal object the elimination of silicon.

My process is a filtration process carried on outside of the furnace or melting-chamber and is based on the fact that if liquid pig-iron containing impurities is brought into contact with liquid basic slag a reaction occurs, and so long as oxide of iron continues in the slag and the base is in excess the impurities are transferred from the metal to the slag and metallic iron is reduced from the slag and takes the place of the expelled impurities. The reaction that occurs during the operation is of a very active character, and its effect is not only to maintain but in some cases to raise the temperature of the basic slag. It is this fact which enables me to carry on my filtration process of purification outside of the furnace and in a continuing manner. If there is no mechanical loss in conducting the operation, there will be, in weight, considerably more of the purified metal than of the impure metal at the beginning, and this in consequence of the transference of the metal from the basic slag.

In applying my process to the treatment of notably silicious pig-iron—such, for instance, as those made in the State of Alabama—I prefer to proceed as follows: In a regenerative gas-furnace I make a basic slag consisting of oxide of iron and lime mixed. I melt this at a very high temperature, in order to get it extremely hot and limpid and have it in its most effective basic condition. I pour this slag at its high temperature into a suitable vessel, so that a deep body or column is maintained. It will remain in a fluid condition without the application of external heat. The metal to be purified, as cast-iron, is obtained from the blast-furnace or elsewhere and is poured from above into the column of slag, through which it sinks by reason of its superior gravity to the bottom, where it accumulates. It is found that in its passage through the slag the metal is desiliconized, so that it arrives and accumulates at the bottom in a purified condition, other foreign matters than the silicon being also incidentally removed to a considerable extent.

The bath or column of liquid slag should be of considerable depth, an increase of depth within reasonable limits being attended with advantage. The reactions occurring during the process are of such character as to maintain the temperature and admit of the operation being carried on continuously and for a long period of time without application of heat from an external source.

At the bottom of the vessel I provide a tap-hole, through which the purified metal is withdrawn into another vessel while impure metal is being run in at the top, and in this way I am enabled to make the process a continuous one. Care should be taken that the metal is poured into the top as fast or a little faster than it is run out at the bottom, to the end that there may be no escape of the slag.

The process is very rapid and practically instantaneous. The silicon is eliminated from the iron, and as metallic iron takes the place of the impurities expelled there is no waste. The refined iron may be transferred to the basic open-hearth furnace, so that it can be further purified and the temperature raised, so that the best quality of low-phosphorous steel can be obtained and cast into ingots without skulling. I arrange the composition of my slag according to the character of the work to be done. If I desire only to desiliconize without eliminating materially the carbon or phosphorus, I put into the slag only so much oxide of iron as will be exhausted by the time it has expelled the silicon from the metal. As soon as this occurs the reaction ceases, as there is no oxygen left for the work.

In plants where steel-making is carried on by the basic process I propose to utilize the waste basic slag of the process by running through it while in its original liquid condition the cast-iron to be purified, thereby reducing all the silicon and more or less of the carbon and phosphorus and fitting the iron for subsequent treatment, which may consist in subjecting it to action in the basic converter or furnace which produced the basic slag. The result of the treatment of the cast-iron by the basic slag from the furnace is a metal low in silicon and more or less reduced in carbon and phosphorus and well constituted to go to the basic converter or furnace for complete dephosphorization. In thus utilizing the waste slag from the basic process I propose to transfer it at once and while in its original fluid state to a suitable vessel in which it may be maintained in a deep body or column and to pour the liquid metal down through it in the manner heretofore explained.

In practice it is found that by bringing the liquid metal and the liquid slag into contact by a filtration process, as herein described, with a deep column or body of slag I am enabled to secure their thorough and intimate contact in all their parts, and thus to insure a rapidity and uniformity of purification which cannot be otherwise obtained.

If complete purification is desired, so that practically all the impurities will be removed, I find that the best results are obtained by subdividing or breaking up the fluid iron into a series of small streams and allowing it to fall in this form into and through the slag, this subdivision being attended with an increased exposure of surface to the slag and resulting in a more rapid completion of the process.

Metal of the same composition as "muck-bar" may in this manner be obtained directly from the crude iron.

Having thus described my invention, what I claim is—

1. The process of purifying iron, which consists in placing in a suitable vessel a deep column of liquid basic slag, pouring the molten iron downward through the slag, thereby causing the metalloids and other impurities to combine with the basic elements of the slag, the reaction liberating heat, whereby the slag is maintained in a fluid state, continuing the pouring of impure metal through the slag, and separating the purified metal from the slag.

2. The process of purifying iron, which consists in treating iron by the basic process, removing the resulting basic slag to a vessel constructed to hold a deep column of the slag, pouring molten iron to be purified downward through the slag, thereby causing the metalloids or other impurities to combine with the basic elements of the slag, the reaction liberating heat, whereby the slag is maintained in a fluid state, continuing the pouring of impure metal through the slag, and separating the purified metal from the slag.

3. The process of purifying iron, which consists in placing in a suitable vessel a deep column of liquid basic slag, pouring the molten iron downward through the slag, thereby causing the metalloids or other impurities to combine with the basic elements of the slag, the reaction liberating heat, whereby the slag is maintained in a fluid state, continuing the pouring of impure metal through the slag, and withdrawing the purified metal from below the slag.

BENJAMIN TALBOT.

Witnesses:

J. W. SEE,

JAS. FITTON.